United States Patent [19]

Lever

[11] Patent Number: 5,944,840
[45] Date of Patent: Aug. 31, 1999

[54] CONTINUOUS MONITOR FOR INTERRUPT LATENCY IN REAL TIME SYSTEMS

[75] Inventor: Paul D. Lever, Edmonds, Wash.

[73] Assignee: Bluewater Systems, Inc., Edmonds, Wash.

[21] Appl. No.: 08/926,748

[22] Filed: Sep. 10, 1997

[51] Int. Cl.[6] .................................................. G06F 11/00
[52] U.S. Cl. ............................ 714/34; 714/37; 714/42; 714/20; 714/55
[58] Field of Search .......................... 395/183.13, 183.1, 395/183.18, 183.19, 185.087, 185.09, 555, 557, 733; 371/61, 62; 364/715.06, 745.036, 748.04, 569, 571.04, 571.05; 714/34, 42, 43, 55, 56, 37

[56] References Cited

U.S. PATENT DOCUMENTS

| | | | |
|---|---|---|---|
| 4,956,807 | 9/1990 | Hosaka et al. ............................ | 364/900 |
| 5,235,593 | 8/1993 | Grow et al. .............................. | 370/85.5 |
| 5,301,312 | 4/1994 | Christopher, Jr. et al. .............. | 395/575 |
| 5,398,332 | 3/1995 | Komoda et al. .......................... | 395/575 |
| 5,426,741 | 6/1995 | Butts, Jr. et al. ......................... | 395/325 |
| 5,437,039 | 7/1995 | Yuen ........................................ | 395/725 |
| 5,440,722 | 8/1995 | VanderSpek et al. ............. | 395/183.19 |
| 5,452,446 | 9/1995 | Johnson ................................... | 395/600 |
| 5,465,258 | 11/1995 | Adams .................................... | 395/700 |
| 5,522,040 | 5/1996 | Hofsass et al. ..................... | 395/185.08 |
| 5,530,891 | 6/1996 | Gephardt ................................. | 395/800 |
| 5,533,037 | 7/1996 | Shah et al. ............................... | 371/62 |
| 5,535,380 | 7/1996 | Bergkvist, Jr. et al. ................. | 395/550 |
| 5,555,420 | 9/1996 | Sarangdhar et al. .................... | 395/739 |
| 5,555,430 | 9/1996 | Gephardt et al. ........................ | 395/800 |
| 5,564,060 | 10/1996 | Mahalingaiah et al. ................ | 395/871 |
| 5,568,649 | 10/1996 | MacDonald et al. ................... | 395/868 |
| 5,592,674 | 1/1997 | Gluska et al. ........................... | 395/742 |
| 5,613,126 | 3/1997 | Schmidt ................................... | 395/733 |
| 5,651,113 | 7/1997 | Lin et al. ............................ | 395/185.09 |
| 5,708,817 | 1/1998 | Ng et al. .................................. | 395/739 |
| 5,734,876 | 3/1998 | Kowert .................................... | 395/555 |
| 5,768,627 | 6/1998 | Jones et al. .............................. | 395/880 |
| 5,790,840 | 8/1998 | Bulka et al. ............................. | 395/557 |
| 5,845,097 | 12/1998 | Kang et al. .............................. | 395/297 |
| 5,848,265 | 12/1998 | Maas et al. .............................. | 395/555 |
| 5,864,663 | 1/1999 | Stolan ................................. | 395/185.08 |

OTHER PUBLICATIONS

Rolf Oestergaard, "Watchdogs for Interrupt Monitoring", Dr. Dobb's Journal, pp. 60–68, Jun. 1997.

Oestergaard, Rolf V., Watchdogs For Interrupt Monitoring, Dr. Dobb's Journal, Jun. 1997, 5 pp.

*Primary Examiner*—Robert W. Beausoliel, Jr.
*Assistant Examiner*—Andy Nguyen
*Attorney, Agent, or Firm*—Ronald M. Anderson

[57] ABSTRACT

Apparatus and a method for monitoring the time for a computer to process a process associated with an interrupt asserted on a system bus. When the interrupt is asserted, a time stamp value and data associated with the interrupt are stored in one of a plurality of registers. The data associated with the interrupt include an identification of the type of interrupt, the bus, and a device asserting the interrupt. Whenever a time stamp value and associated data are stored in a register, a flag is set ON to indicate information is stored therein. The time stamp value and associated data are stored in an overflow register if every other register is in use. A latency value for the interrupt is determined from the difference between the time stamp value stored in a register and the time when processing of the interrupt process is complete. Interrupts that are asserted by various devices on a plurality of different buses can be monitored, and the latency values and associated data for each interrupt can be determined and stored. A report showing the latency times for the different interrupts can be produced. In addition, an alarm can be produced if the latency time for any interrupt exceeds a predetermined maximum value.

30 Claims, 5 Drawing Sheets

CONTINUOUS MONITOR FOR INTERRUPT LATENCY IN REAL TIME SYSTEMS

FIELD OF THE INVENTION

The present invention generally relates to an apparatus and a method for monitoring interrupts in a computer system, and more specifically, to an apparatus and a method for determining the amount of time required for a computer system to process an interrupt.

BACKGROUND OF THE INVENTION

An interrupt is a transitory event or signal that interrupts a process or program currently running on a processor, and which can be asserted by the hardware and/or software of a computer system. When an interrupt is asserted, it causes the processor to temporarily suspend the execution of all processes that have a lower priority and immediately begin executing an interrupt service routine to carry out the processes associated with the interrupt. The lower priority processes are suspended in such a way that they may be resumed after the processes associated with the interrupt are completed. For example, an interrupt is asserted by a pointing device such as mouse when a user employs the device to select an icon in a graphical display of a computer system. Once the interrupt is asserted, the system's processor will immediately suspend every currently running process that has a lower priority than the interrupt and begin executing the routines that enable the selection of the icon with the pointing device. After the routines associated with the interrupt are completed, the processor will immediately resume the execution of the temporarily suspended processes.

When developing control programs that operate in real time, a software programmer must take into consideration the time period (latency) that will be required for processing interrupts. Specifically, interrupt latency is the delay between the time an interrupt is asserted and the time that execution of an interrupt service routine for the interrupt begins. Also of interest may be the time required to complete the interrupt service routines. The worst case latency time is usually determined by counting the number of instruction cycles that would be employed by an ideal system to process all actions associated with known interrupts. So long as the interrupt latency does not exceed this worst case time period, the real time program should be able to operate a machine or assembly line as intended by the programmer. However, if the latency period is longer than the worst case time contemplated by the programmer, the machines or processes being controlled by the program may fail because the processor in the controlling computer will not be available when required to properly maintain control of the machines or process.

Certain processes will have a higher priority than an asserted interrupt and will thus not be affected by interrupts with a lower priority. But, the design of a real time control program may be adversely affected by an extended interrupt latency resulting from the addition of a new program or hardware that increases the number of relatively higher priority interrupts that must be executed by the processor. The additional time required for processing interrupts due to the addition of a new program or hardware will not be readily apparent. To avoid causing problems with a real time control process, it would be highly desirable to provide a monitor that determines the actual amount of time for a real time computer system to execute each interrupt and to provide a warning if the maximum time permissible for proper execution of the control process is exceeded. Such a monitor should carry out this function with minimum effect on the processes that are being executed in response to any interrupt.

A real time system can develop software "bugs" that degrade its functionality when the amount of time for processing a particular interrupt exceeds a predetermined time interval. For example, a communication link can suffer timing problems that cause a loss of transmitted data, or a patient monitoring system coupled to a patient in intensive care may fail due to excessive interrupt latency, or a monitor for a manufacturing process can lag in providing the actual values associated with the current state of the process. It is well known that determining the cause of a software bug induced by a logical error in a program is relatively simple when compared to finding a bug caused by a time lag in the processing of an interrupt. Also, finding a software bug caused by an intermittent or variable interrupt latency time is even more difficult when the latency has a low frequency of incidence. Since determining whether software bugs are caused by logical errors or latencies in the processing of interrupts has proven to be difficult, there is clearly a need for an inexpensive continuous interrupt monitor that indicates the actual latency in processing each interrupt and provides an indication when the latency has exceeded a predetermined value.

One solution to this problem that exists in the prior art has been to couple an external hardware device, such as a logic analyzer, to a real time system for determining the actual latency of each interrupt. However, a logic analyzer can cost as much as $40,000. Also, a logic analyzer must be continuously coupled to the computer system through an external link, which adds to the inconvenience of employing the analyzer. Thus, the high cost and inconvenience of using a logic analyzer to determine the actual latency of interrupts in a real time system has limited its widespread use for this purpose.

Another prior art solution to this problem has been to employ an internal watchdog timer to determine when the latency of an interrupt has exceeded a maximum value. Typically, the watchdog timer is set to the maximum value when an interrupt is asserted, and immediately begins counting down to a zero value. If the watchdog timer reaches the zero value before all of the actions associated with the interrupt have been processed, an alarm signal is produced. Furthermore, some types of watchdog timers require some processor cycles, which distorts the monitoring of the latency time of an interrupt. Since a typical watchdog timer does not provide for tracking and storing the latency times for each interrupt, the user of a real time system employing a watchdog timer cannot determine if the latency has changed when new hardware or a new process is added to the computer system. Thus, there is a need for an inexpensive apparatus that can monitor, store, and indicate the actual latency for each different interrupt on the system, without significantly increasing the computational overhead on the processor.

SUMMARY OF THE INVENTION

In accord with the present invention, a method is defined for determining an amount of time required for a computer to process an interrupt. The method includes the step of determining when the interrupt is asserted. Assertion of the interrupt causes the computer to initiate an interrupt service routine. A temporal value indicating a time when the interrupt is asserted is stored, and a current time when the computer has initiated the interrupt service routine is determined. Based on the difference between the temporal value that was stored and the current time, a latency value is computed. The latency value is employed as an indication of the amount of time required for the computer to initiate the interrupt service routine.

In addition it is sometime important to determine how much time was required for the computer to complete the interrupt service routine. This time corresponds to the difference between the time when the interrupt service routine is completed and the time when the interrupt service was initiated.

The step of storing the temporal value further includes the step of storing data associated with the interrupt. The data associated with the interrupt comprise an indication of a device that asserted the interrupt. Both the temporal value and the data associated with the interrupt are stored in a register. Included in the data associated with the interrupt is a flag indicating that the temporal value and the data are stored in the register. In addition, the data associated with the interrupt identifies the interrupt as a specific one of a plurality of different interrupts available on the computer.

The method further includes the step of storing the temporal value and the data associated with the interrupt in an overflow register when no other register is available for storing the interrupt.

Preferably, the interrupt is asserted on a bus of the computer. The bus may be either a PCI bus, an ISA bus, a VME bus, a SCSI bus, a NuBUS bus, a USB bus, a CardBus bus, or a FireWire bus.

The latency value is determined for the interrupt each time that it is asserted. All of the latency values for the interrupt are preferably stored in a database table. A report can then be produced that identifies the interrupt and includes the latency values for the interrupt. In addition, one or more statistical values may be included in the report, such as a minimum, a maximum, a median, a mode, and/or a mean value of the latency values determined for the interrupt. While monitoring the interrupts, the method may include the step of comparing the latency value to a predefined maximum value. If the latency value is greater than the predetermined maximum value, an alarm is produced to alert the user.

Another aspect of the present invention is directed at a system for determining an amount of time required for a computer to process an interrupt. The system includes a memory that stores a plurality of logical steps and an interrupt latency monitor coupled to the memory. The interrupt latency monitor includes a timer and implements a plurality of functions that are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
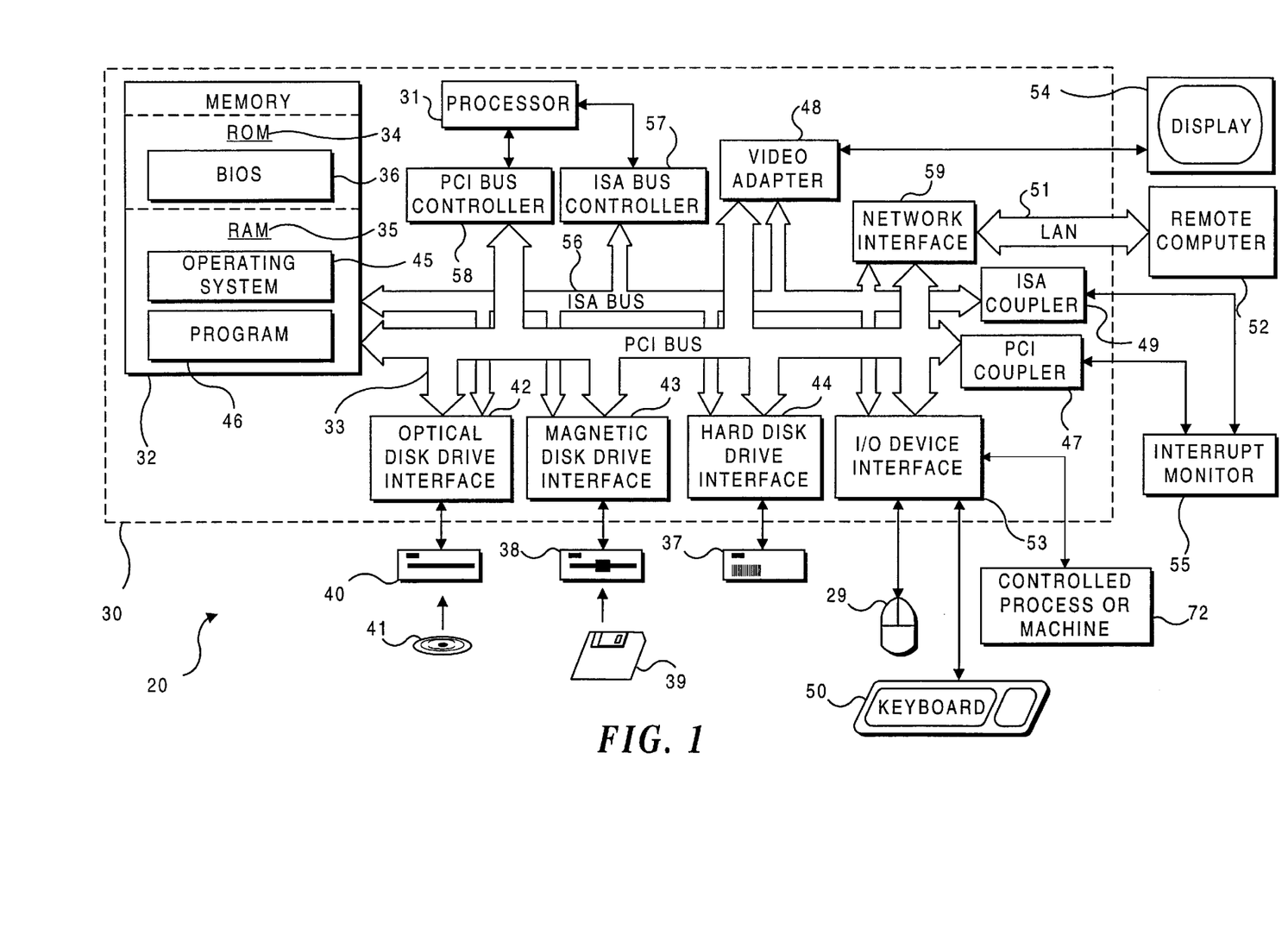
FIG. 1 is a block diagram of a typical digital computer system suitable for use with a preferred embodiment of the present invention.

In FIG. 1, an exemplary computer system 20 with which the present invention may be used includes a central processor unit (CPU) card 30, comprising a processor 31, a memory 32, an Industry Standard Architecture (ISA) bus 56, and a Peripheral Component Interconnect (PCI) bus 33. A PCI bus controller 58 and an ISA bus controller 57 are employed by processor 31 to monitor and control PCI bus 33 and ISA bus 56, respectively. In fact, most newer PCI bus controls implement the ISA bus behind the PCI bus, so the processor 31 accesses the ISA bus via the PCI bus controller, but, for simplification, separate ISA and PCI bus controllers are shown in the Figure.

Memory 32 includes read only memory (ROM) 34 and random access memory (RAM) 35. The basic routines that are employed to transfer information between the components of CPU card 30 are implemented by a basic input/output system (BIOS) 36, which is stored in ROM 34. An operating system 45 and a software program 46 are loaded into RAM 35. In one preferred embodiment, operating system 45 is Microsoft Corporation's WINDOWS CE; however, the invention is not in any way limited to use with this operating system. It should be noted that WINDOWS CE is not ideally suited for real time process control systems, because of the manner in which it handles interrupts. Certain aspects of the present invention are implemented by operating system 45 using a plurality of routines provided by software program 46. Other programs that may also be loaded into RAM 35 include device drivers that are associated with devices coupled to CPU card 30 through either ISA bus 56 or PCI bus 33 and which manage an interrupt asserted by the associated device.

CPU card 30 optionally includes a hard disk drive 37. Although not required, the CPU card may also include other nonvolatile storage devices such as a magnetic disk drive 38, and an optical disk drive 40. These nonvolatile storage devices are coupled to either PCI bus 33 or ISA bus 56 by a hard disk drive interface 44, a magnetic disk drive interface 43, and an optical disk drive interface 42, respectively. Magnetic disk drive 38 is employed for reading and writing to a removable magnetic disk 39. Also, optical disk drive 40 provides for reading from or writing to a removable optical disk 41, such as a CD-ROM or other optical media. Each drive and their associated media provide for the nonvolatile storage of computer readable instructions, and other data for use by CPU card 30. In the preferred embodiment, different types of data may be stored by hard disk 37, magnetic disk 39, optical disk 41, ROM 34, and RAM 35. Furthermore, other types of media, such as magnetic cassettes and flash memory cards (not shown), may be employed by CPU card 30 for storing data.

A user of CPU card 30 may employ input devices such as a pointing device (mouse) 29 and a keyboard 50, to input commands and/or data. Although not shown, other types of input devices may also be employed with CPU card 30, including a microphone, joystick, game pad, satellite dish, and scanner. An input device is coupled by an input/output (I/O) device interface 53 to processor 31 through either PCI bus 33 or ISA bus 56. A plurality of I/O device interfaces (not separately shown) may be employed to provide various ports, such as serial, parallel, game, small computer serial interface (SCSI), universal serial bus (USB) and FireWire, for connecting different types of input/output devices to CPU card 30. For instance, a controlled process or machine 72 may be coupled to a port using an appropriate I/O interface. Also, interfaces for one or more analog-to-digital converters (ADCs), digital-to-analog converters (DACs), digital input/output, encoders, video frame grabbers, and other equipment that might be used in a process may optionally be included. A display 54 is connected to CPU card 30 through a video adapter 48 that is coupled to processor 31 through either PCI bus 33 or ISA bus 56.

In FIG. 1, CPU card 30 is shown operating in a networked environment that employs logical connections to one or more remote computers, such as a remote computer 52, which may be a server, a router, a network personal computer (NETPC), or another CPU card, and typically will include many of the elements described above that are relative to CPU card 30. A network interface 59 is coupled to processor 31 through either ISA bus 56 or PCI bus 33. Network interface 59 is also coupled through a local area network (LAN) 51 to remote computer 52. LAN 51 is employed to provide the logical connection between CPU card 30 and a networked environment that may include an office network, an intranet, and the Internet. In the networked environment, programs that are relative to CPU card 30 may be stored in the memory of remote computer 52. Moreover, it will be appreciated by those skilled in the art that other means, such as a modem (not shown), may be employed to establish a logical connection through a wide area network (WAN) between CPU card 30 and remote computer 52.

In FIG. 1, an interrupt monitor 55 that operates in accord with one preferred embodiment of the present invention is shown coupled to a PCI coupler 47 and an ISA coupler 49 that are directly connected to PCI bus 33 and ISA bus 56, respectively. In this physical configuration, interrupt monitor 55 detects when an interrupt is asserted on either PCI bus 33 or ISA bus 56 and determines the latency of CPU card 30 in executing the processes associated with each interrupt, as explained below.

Figure 2:
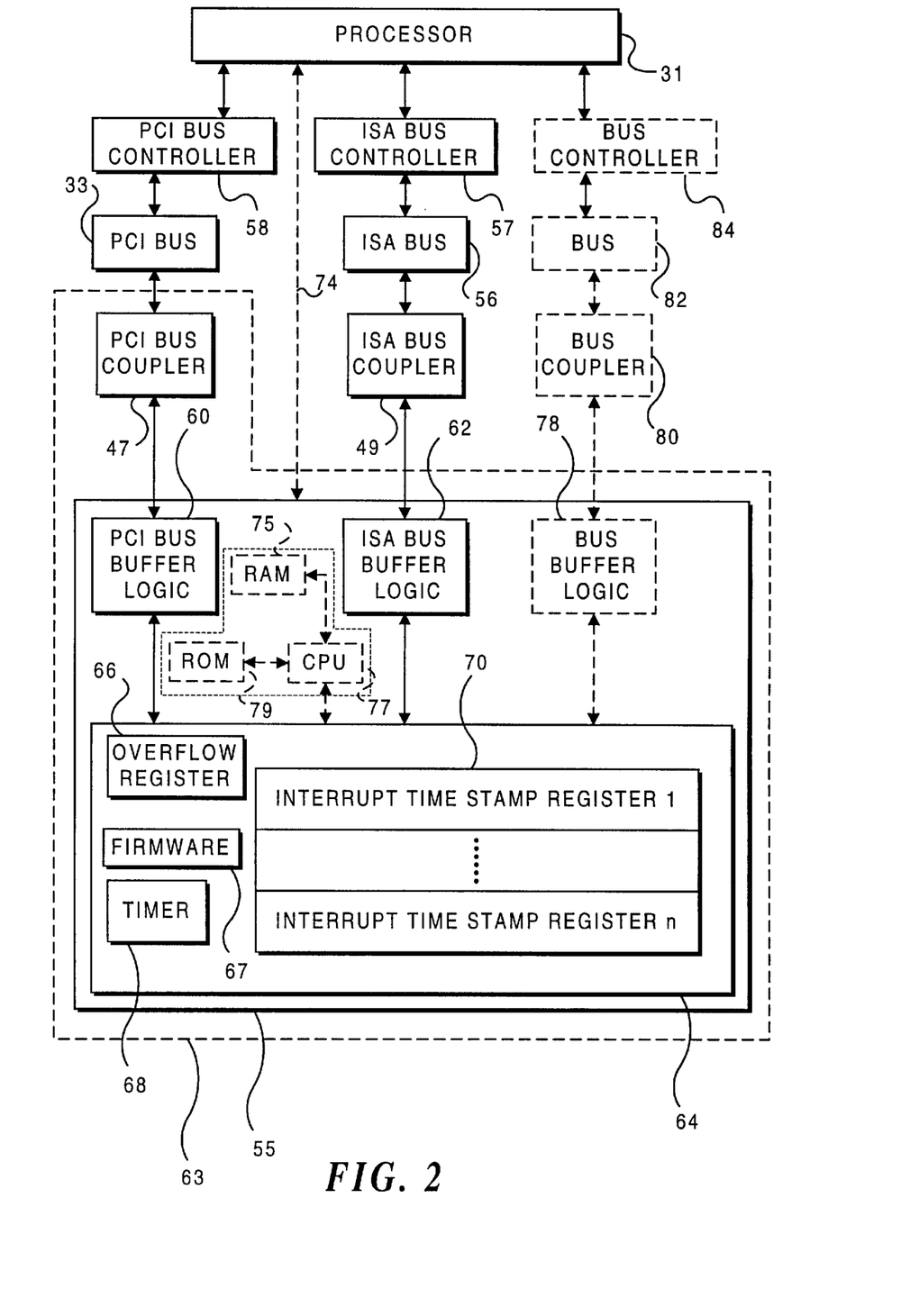
FIG. 2 is an exemplary diagram showing the present invention coupled to a plurality of buses in a digital computer like that in FIG. 1.

FIG. 2 displays an overview of the preferred embodiment of interrupt monitor 55 coupled to a plurality of buses. Monitor 55 internally includes a tagging device 64 that is coupled to PCI bus controller 58 and ISA bus controller 57 through a PCI bus buffer logic circuit 60 and an ISA bus buffer logic circuit 62, respectively. Optionally, a plurality of buses, such as a bus 82 may be coupled to tagging device 64 through a bus coupler 80 and bus buffer logic circuit 78. The buffer logic is employed to detect and temporarily store signals that correspond to an interrupt on a particular bus and provide the signals in a format usable by tagging device 64.

Tagging device 64 includes a timer 68, which provides an indication of the current time in highly resolved increments. In the preferred embodiment, timer 68 is implemented as a counter that measures time in 500 nanosecond increments, which effectively provides a one microsecond resolution. Tagging device 64 also includes n time stamp registers 70. Also included is an overflow register 66. Tagging device 64 implements a portion of the present invention functions according to a program defined in firmware 67.

In this embodiment of the present invention, the functionality of tagging device 64 is implemented in a programmable logic device (PLD). The PLD is programmed with a set of logic equations and then acts like a digital circuit, serving to provide a time stamp register for each interrupt that may be asserted (at least, to the limit of the number of time stamp registers in the tagging device). Also, each register is sufficiently large to store a highly resolved (1 sec) temporal value and data associated with the interrupt, i.e., a plurality of flags and tags.

The initial commercial embodiment of the present invention will incorporate the interrupt monitoring system on the CPU board, and the board will be plugged into a passive backplane, as is typical of industrial computers. The present invention may monitor all of the buses of system 20. It is contemplated that alternatively, interrupt monitor 55 can be included with any one of the bus couplers. For example, in FIG. 2, a dotted line 63 suggests that PCI bus coupler 58 incorporates interrupt monitor 55. It is understood that other embodiments could physically incorporate interrupt monitor 55 with any one of the other bus couplers supported by the present invention. Also, a plurality of bus couplers, e.g., ISA bus coupler 49 and bus coupler 80, could be coupled to the interrupt monitor to provide for the monitoring of interrupts on other system buses.

In FIG. 2, an optional configuration (shown within dash lines) is illustrated that incorporates a random access memory (RAM) 75, a central processing unit (CPU) 77, and a read only memory (ROM) 79 into interrupt monitor 55 for implementing the present invention. If this option is used, it is envisioned that a substantial portion of the logical steps of program 46 would be included in a program stored in ROM 79 and implemented by CPU 77. CPU 77 could employ RAM 75 as a cache for determining and temporarily storing latency values for asserted interrupts. Moreover, the latency values could be retrieved at periodic intervals by processor 31 from RAM 75 and thereby avoid using the computational resources of CPU card 30. For this alternative embodiment to work properly, the main processor dispatch code must write to the interrupt monitor at the beginning and at the end of the interrupt service routine so that the times can be saved by the interrupt monitor.

Interrupt monitor 55 is able to differentiate between interrupts asserted by processor 31 and devices disposed on a system bus, i.e., on PCI bus 33 or ISA bus 56. FIG. 2 includes a dash line 74 that indicates detection of interrupts initiated by processor 31. Generally, only those processors that include a terminal on which a signal changes state to indicate the assertion of an interrupt by the CPU can be handled by the monitor. For most applications, the interrupt monitor need only determine the latency of externally generated interrupts.

Figure 3:
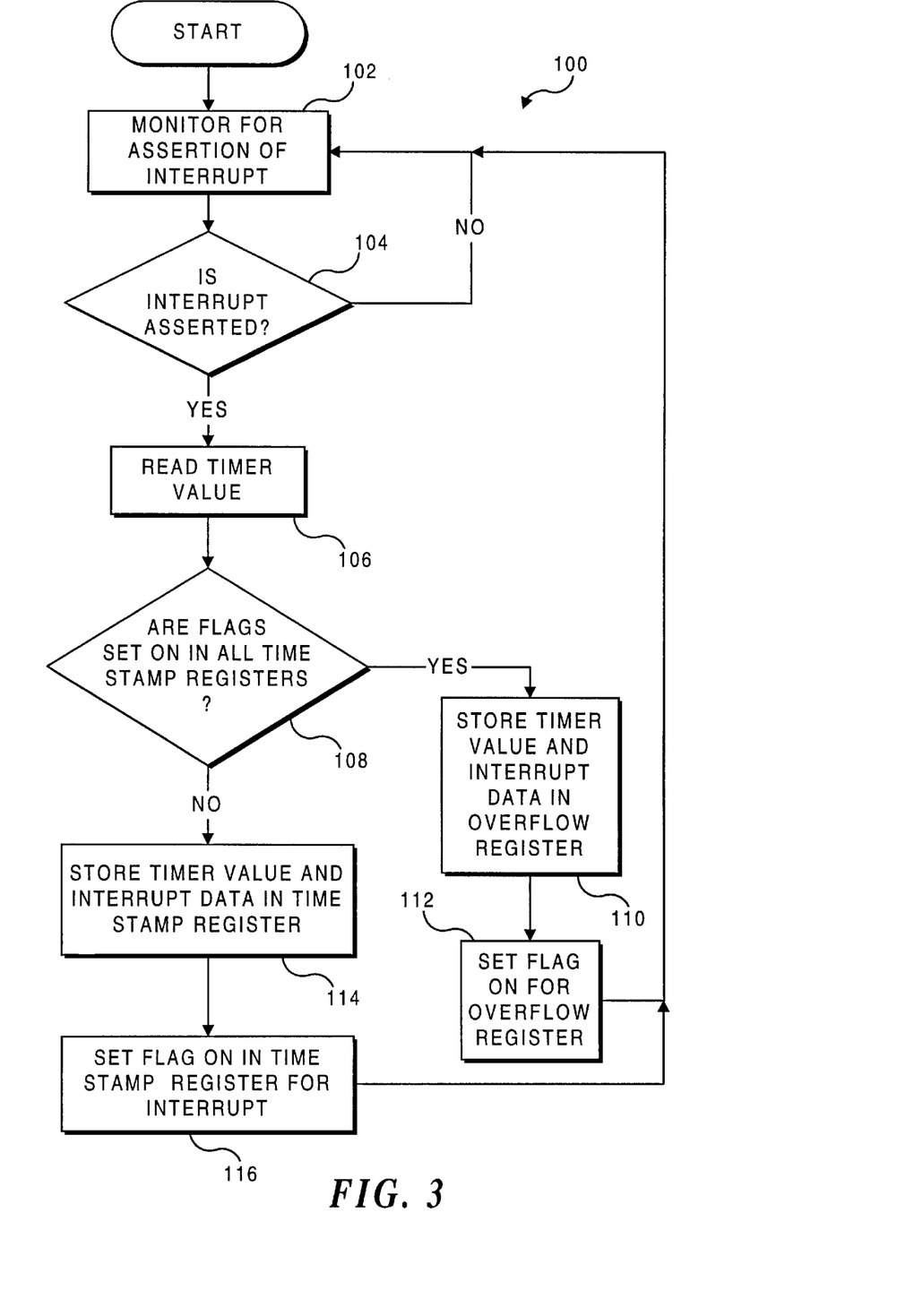
FIG. 3 is a flow chart that illustrates the steps employed to store the current time stamp value when an interrupt has occurred.

In FIG. 3, an overview 100 depicts the logical steps employed by the program in firmware 67 employed for storing a current value of time that corresponds to the asserted interrupt, in a time stamp register. Following a start block, the logic steps to a block 102 and begins monitoring, to detect the assertion of an interrupt. The present invention provides for detecting interrupts asserted by a device coupled to the system buses, i.e., PCI bus 33 or ISA bus 56 (but might be used for detecting processor interrupts, depending upon the type of processor employed). In a decision block 104, an evaluation is made as to whether an interrupt has been asserted. If not, the logic loops back to block 102 and continues to monitor for any asserted interrupt. If an interrupt has been asserted, the logic moves to a block 106 and the current value of timer 68 is read.

Advancing to a decision block 108, if every flag is set ON in all of the one through n time stamp registers, then the logic advances to a block 110. In this block, the current value of timer 68 is stored with data associated with the interrupt in the overflow register. (It should be noted that alternatively, a dedicated slot can be assigned to each different register, thereby avoiding the need to search for the first empty register. The disadvantage of assigning each register to an interrupt is that it is then not possible to detect when a shared interrupt has a second request on it.) The associated data for an interrupt that are stored may include tags that indicate an interrupt number (typically for the ISA bus), and designate bus specific information, such as the type of bus and the physical slot number of a device that has asserted the interrupt on the bus. The types of buses that may be indicated by the tag include PCI, ISA, VME, NuBUS, SCSI, CardBus, USB, and FireWire. The logic moves to a block 112, and a flag is set ON for overflow register 66, indicating that information is currently stored in the overflow register. While not shown on the flow chart, the setting of this flag to the ON state may be employed to produce an alarm that alerts the user or operator of the computer system that all available time stamp registers have been used. Alternatively, the event can simply be recorded in data for later evaluation, recognizing that any further interrupts that occur while no time stamp registers are available to record their start time will not be processed by the monitor to determine their latency. Next, the logic loops back to block 102 and continues monitoring for asserted interrupts.

If the determination in decision block 108 is negative, the logic moves to a block 114 and the current value of timer 68 is stored with data associated with the interrupt in one of the available time stamp registers. The logic then advances to a block 116, and a flag is set ON to indicate that information is currently stored in the time stamp register just employed. The logic loops to block 102 and continues monitoring for interrupts.

Figure 4:
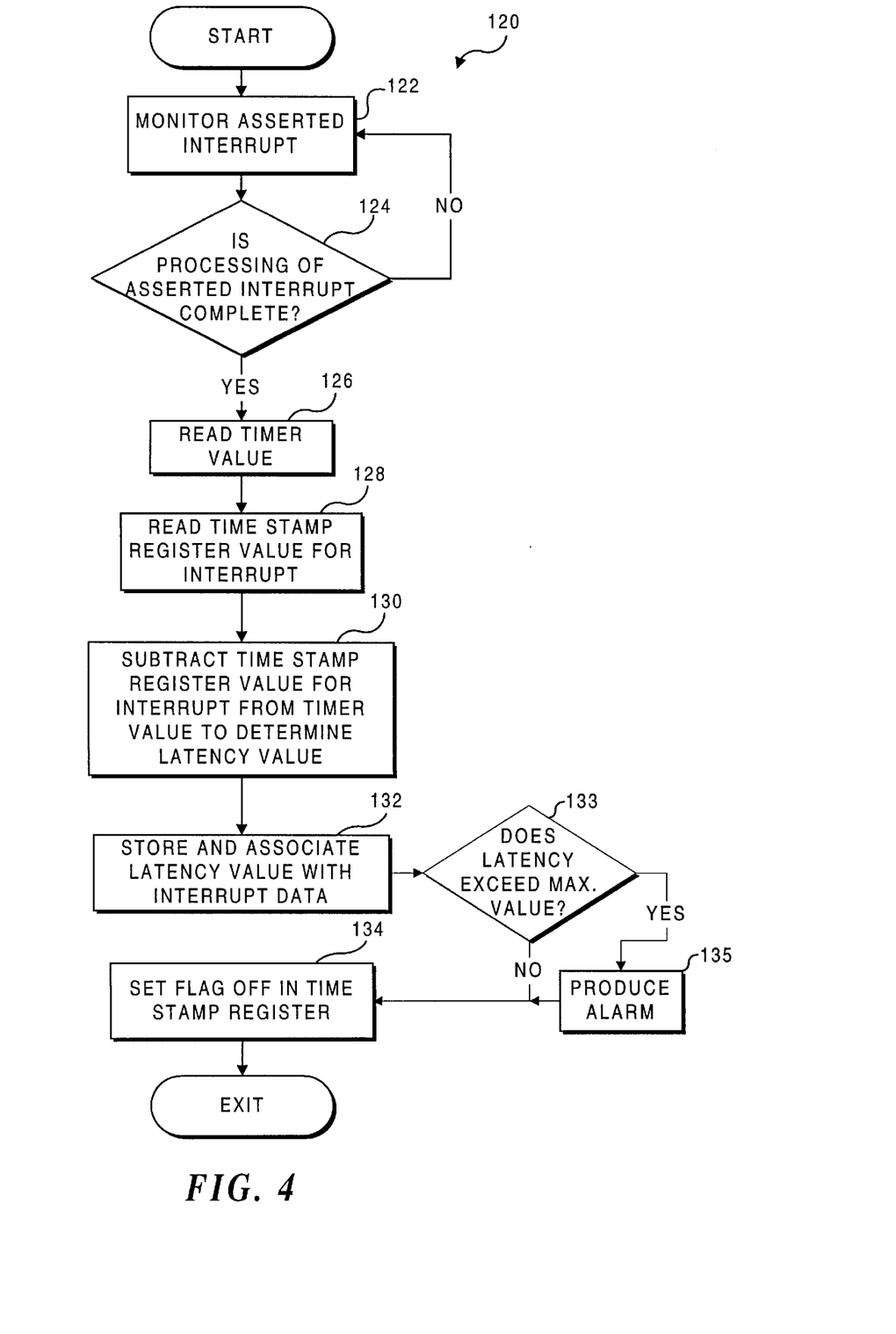
FIG. 4 is a flow chart that depicts the logical steps for determining the latency of a system implementing processes associated with the interrupt.

In FIG. 4, a flow chart 120 shows the logical steps employed by the present invention for determining the latency of an asserted interrupt that has a temporal value stored in a time stamp register. From a start block, the logic moves to a block 122, which indicates that the device monitors the current status of each asserted interrupt. A decision block 124 provides for determining whether the processing of any interrupt that has been initiated is complete. If not, the logic returns to block 122 and continues monitoring the status of each asserted interrupt. However, if the determination at decision block 124 is affirmative, the logic moves to a block 126, and the current value of timer 68 is read.

Advancing to a block 128, the stored temporal value for the interrupt noted in decision block 124 is read from the time stamp register in which its start time was stored. This time stamp register may be either one of the n time stamp registers or may be the overflow register. Stepping to a block 130, a latency value for the interrupt is found, which is equal to the difference between the stored temporal value and the current value of timer 68. Moving to a block 132, the latency value for the interrupt is stored. A decision block 133 determines if the latency value exceeds a predefined maximum value that represents the maximum time that is permitted for processing interrupts in the real time control system being monitored. If the latency value exceeds the maximum value, a block 135 notes that an alarm (audible, visual, or simply recorded) is produced so that the user or operator of the real time control system can take appropriate action.

If the latency value is less than the allowed maximum (and after block 135), the logic flows to a block 134. This block indicates that the flag is set OFF for the time stamp register used for the interrupt just processed. The logic then exits this routine of the interrupt monitoring program.

Figure 5:
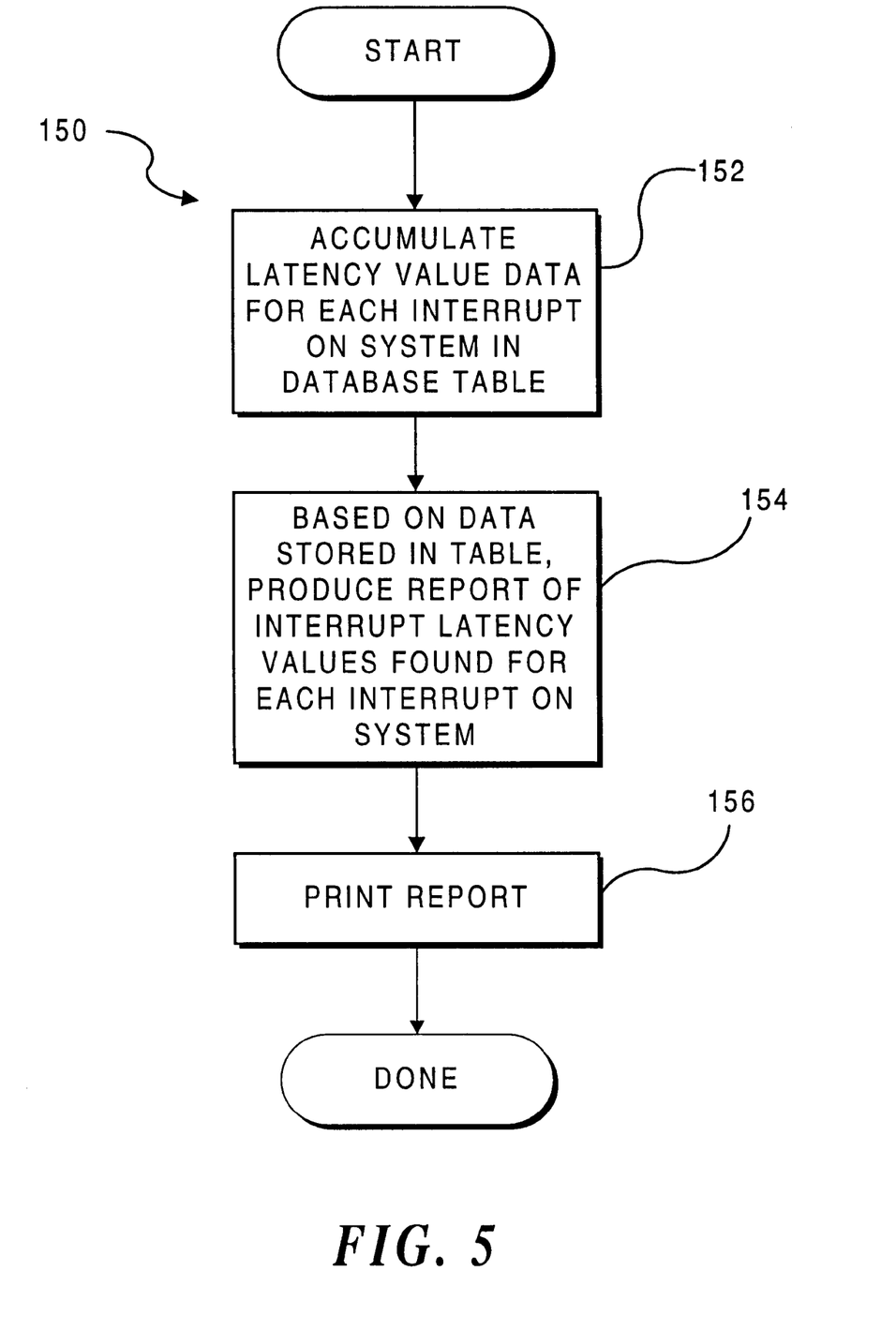
FIG. 5 is a flow chart that displays the steps for producing a report that shows the interrupt latency times.

FIG. 5 is a flow chart 150 illustrating the logical steps employed to produce a report that indicates the latency times determined for each interrupt on the computer system during a defined period of time. Moving from a start block to a block 152, the logic provides for accumulating the latency value data for each interrupt on the system determined as described above, in a database table. For this purpose, almost any conventional database program such as Microsoft Corporation's ACCESS can be employed. Typically, the steps in flow chart 150 would be implemented on remote computer 52 that is coupled to CPU card 30, so that processor 31 can continue to control a process or machinery. However, during times when CPU card 30 is not being used for process control, it can alternatively be used for implementing the steps of flow chart 150.

A block 154 indicates that based on the data stored in the table, the (database program) produces a report that shows the interrupt latency values found for each interrupt on the system during the period in which the latency times were monitored. In a block 156, the report is printed (optional). It is envisioned that the report could show statistical information including the mean, median, and mode values for the latency times associated with each interrupt, indicate each time that the overflow time stamp register was required, and show the times and interrupts that had latency values in excess of the predetermined maximum value. Also, the report could be produced in a format that includes a graphical display of the data, e.g., a histogram, a pie chart, a bar graph, and/or a line graph.

Several benefits that arise from using the present invention include: (1) continuous monitoring of the latency of interrupts in actual use conditions on a real time control system; (2) extremely low computational overhead for determining and reporting the latency of interrupts; and (3) relatively low cost and convenient internal installation of the interrupt monitor board within the chassis of the controlling computer.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for determining an amount of time required for a computer to process an interrupt, comprising the steps of:

(a) determining when the interrupt is asserted, assertion of the interrupt causing the computer to subsequently initiate an interrupt service routine;

(b) storing a temporal value indicating a time when the interrupt is asserted;

(c) determining a current time when the computer has initiated the interrupt service routine; and (d) determining a latency value for the interrupt that corresponds to a difference between the temporal value that was stored and the current time, said latency value being employed as an indication of the amount of time required for the computer to initiate the interrupt service routine.

2. The method of claim 1, further comprising the steps of determining a completion time when the computer has completed the interrupt service routine; and determining an amount of time required for the computer to complete the interrupt service routine, said amount of time corresponding to a difference between the completion time and the time when the computer initiated the interrupt service routine.

3. The method of claim 1, wherein the step of storing the temporal value further includes the step of storing data associated with the interrupt.

4. The method of claim 3, wherein the data associated with the interrupt comprise an indication of a device that asserted the interrupt.

5. The method of claim 3, wherein the temporal value and the data associated with the interrupt are stored in a register, the data associated with the interrupt comprising a flag indicating that the register is in use for storing the temporal value and the data.

6. The method of claim 5, further comprising the step of storing the temporal value and the data associated with the interrupt in an overflow register when no other register is available for storing the interrupt.

7. The method of claim 3, wherein the data associated with the interrupt identifies the interrupt as a specific one of a plurality of different interrupts available on the computer.

8. The method of claim 1, wherein, the interrupt is asserted on a bus of the computer.

9. The method of claim 8, wherein the bus comprises at least one of a PCI bus, an ISA bus, a VME bus, a SCSI bus, a NuBUS bus, a USB bus, a CardBus bus, and a FireWire bus.

10. The method of claim 3, further comprising the steps of determining latency values for the interrupt at each of a plurality of times that it is asserted; and storing the latency values for the interrupt.

11. The method of claim 10, further comprising the step of producing a report that identifies the interrupt and includes the latency values for the interrupt.

12. The method of claim 11, further comprising the step of determining a statistical value that is included in the report, said statistical value comprising at least one of: a minimum, a maximum, a median, a mode, and a mean value of the latency values for the interrupt.

13. The method of claim 1, further comprising the steps of:
   (a) comparing the latency value to a predetermined maximum value; and
   (b) producing an alarm indication if the latency value is greater than the predetermined maximum value.

14. A system for determining an amount of time required for a computer to process an interrupt, comprising:
   (a) a memory that stores a plurality of logical steps; and
   (b) an interrupt latency monitor coupled to the memory, said interrupt latency monitor including a timer and being adapted to couple to the computer and to implement the plurality of logical steps, to determine when an interrupt is asserted, assertion of the interrupt causing the computer to initiate execution of a process associated with said interrupt, said plurality of logical steps implemented by the interrupt latency monitor including:
      (i) storing a temporal value in the memory that corresponds to a current value of said timer when the interrupt is asserted;
      (ii) reading a current value of the timer when the computer subsequently responds to the assertion of the interrupt by initiating an interrupt service routine; and
      (iii) determining a latency value for the interrupt that corresponds to a difference between the temporal value stored in the memory and the current value of the timer read when the computer initiates the interrupt service routine, said latency value indicating the amount of time required for the computer to process the interrupt.

15. The system of claim 14, wherein said plurality of logical steps further include the steps of determining a completion time by reading a value of the timer when the computer has completed the interrupt service routine; and determining an execution time required for the computer to complete the interrupt service routine, said execution time corresponding to a difference between the completion time and the value of the timer that was read when the computer responded to the assertion of the interrupt.

16. The system of claim 14, wherein the interrupt latency monitor comprises a programmable logic device.

17. The system of claim 14, wherein the interrupt latency monitor is adapted to couple to a bus of the computer to monitor each of a plurality of different interrupts conveyed on the bus and to determine the time for the computer to process each interrupt.

18. The system of claim 17, wherein the bus includes a slot, and the interrupt latency monitor and the memory are mounted on a circuit board adapted to be inserted into a slot of the bus to couple to the computer.

19. The system of claim 18, wherein the interrupt latency monitor includes a buffer circuit for detecting and temporarily storing each interrupt conveyed on the bus, and for formatting the interrupts in a format required for processing by the interrupt latency monitor.

20. The system of claim 14, wherein the timer comprises a counter.

21. The system of claim 14, wherein the interrupt latency monitor includes a processor for implementing the logical steps.

22. The system of claim 14, wherein the computer is coupled to a nonvolatile storage, the interrupt latency value being stored in the nonvolatile storage for later retrieval.

23. The system of claim 14, wherein the interrupt latency monitor includes a plurality of registers for storing temporal values, each temporal value stored in a register corresponding to a time when one of a plurality of different interrupts was asserted.

24. The system of claim 23, wherein the plurality of registers include an overflow register for storing the temporal value when none of the plurality of registers is available for storing the temporal value.

25. The system of claim 24, wherein the interrupt latency monitor stores associated data for each of the plurality of different interrupts in the plurality of registers, along with the temporal value for said interrupt.

26. The system of claim 25, wherein the associated data identifies the interrupt and indicates that the one of the plurality of registers is in use for storing the associated data and the temporal value.

27. An interrupt latency monitor for monitoring interrupts asserted on a bus of a computer to which said monitor is adapted to couple, to determine an amount of time for the computer to process each of the interrupts, comprising:
   (a) a timer for indicating time;
   (b) a circuit for defining logical steps implemented by the interrupt latency monitor;
   (c) a plurality of registers adapted to store temporal values for different interrupts asserted on the computer;
   (d) a buffer circuit for detecting and temporarily storing each interrupt asserted on the bus, and for formatting the interrupts in a format required for processing by the interrupt latency monitor; and (e) a logic device that responds to detection of an interrupt asserted on the bus by the buffer circuit and in response thereto, obtains a temporal value for the interrupt from the timer indicating a time when the interrupt was asserted on the bus, and stores the temporal value in one of the plurality of registers, said timer also indicating a time when an interrupt service routine is subsequently initiated by the computer in response to assertion of the interrupt, a difference between the temporal value stored in said one of the plurality of registers and the time when the interrupt service routine is initiated by the computer is completed indicating a latency for the interrupt.

28. The interrupt latency monitor of claim 27, wherein the logic device also determining a completion time by reading a value of the timer when the computer has completed the interrupt service routine; and determining an execution time required for the computer to complete the interrupt service routine, said execution time corresponding to a difference between the completion time and the value of the timer that was read when the computer responded to the assertion of the interrupt.

29. The interrupt latency monitor of claim 27, wherein the circuit for defining logical steps comprises a memory for storing machine instructions, and wherein said logic device comprises a processor controlled by the machine instructions stored in the memory, said machine instructions causing the processor to determine the latency for each interrupt.

30. The interrupt latency monitor of claim 27, further comprising a plurality of couplers adapted to couple the logic device to a plurality of different buses in the computer, and a plurality of buffer circuits, each buffer circuit being connected between the plurality of couplers and the logic device, said logic device determining the latency for a plurality of the interrupts on a plurality of the buses.

* * * * *